(12) United States Patent
Seo et al.

(10) Patent No.: US 6,649,131 B2
(45) Date of Patent: Nov. 18, 2003

(54) PREPARATION OF HIGHLY PURE COPPER OXIDE FROM WASTE ETCHANT

(75) Inventors: Kyu Bum Seo, Shiheung (KR); Young Sun Uh, Sungnam (KR); Young Hee Kim, Seoul (KR); Jung Yoon Han, Inchon (KR); Sun Jin Kim, Seoul (KR); Myung Hun Kim, Seoul (KR)

(73) Assignee: Myung Jin Chemical Co., Ltd., Shiheung (KR)

( * ) Notice: Subject to any disclaimer, the term of this patent is extended or adjusted under 35 U.S.C. 154(b) by 116 days.

(21) Appl. No.: 09/767,950

(22) Filed: Jan. 24, 2001

(65) Prior Publication Data

US 2001/0051103 A1 Dec. 13, 2001

(30) Foreign Application Priority Data

May 30, 2000 (KR) ........................................ 2000/29391

(51) Int. Cl.$^7$ ................................................. C01G 3/00
(52) U.S. Cl. ........................................... 423/42; 423/43
(58) Field of Search ........................... 423/42, 43, 604; 216/93

(56) References Cited

U.S. PATENT DOCUMENTS 4,915,776 A * 4/1990 Lee
5,560,838 A * 10/1996 Allies et al. .................. 216/93

FOREIGN PATENT DOCUMENTS

JP 58-41721 * 3/1983
JP 5-319825 * 3/1993

* cited by examiner

*Primary Examiner*—Steven Bos
(74) *Attorney, Agent, or Firm*—Birch, Stewart, Kolasch & Birch, LLP

(57) ABSTRACT

A method for recycling copper oxide includes: a first step in which a sodium hydroxide aqueous solution is added to acidic copper chloride waste etchant produced in the PCB industry, to obtain copper hydroxide slurry; and a second step in which the slurry obtained in the first step is heated and sintered to thereby prepare a needle-form copper oxide. Since copper oxide has a purity of more than 99.0 wt % and the needle-form crystal morphology, so that it has an excellent filtering ability and homogeneous particle size distribution.

3 Claims, No Drawings

PREPARATION OF HIGHLY PURE COPPER OXIDE FROM WASTE ETCHANT

BACKGROUND OF THE INVENTION

1. Field of the Invention

The present invention relates to preparation of a highly pure copper oxide from waste etchant created when a printed circuit board (PCB) is fabricated, more particularly, to preparation of a highly pure copper oxide from waste etchant in which alkali aqueous solution (sodium hydroxide or potassium hydroxide) is added to a waste etchant to obtain copper hydroxide and then the copper hydroxide is dehydrated to form copper oxide which has a high purity (99.0 wt %) and an excellent filtration ability.

2. Description of the Background Art

Printed Circuit Boards are widely used in many electronic computer devices. A chemical milling process is commonly utilized in manufacturing printed circuit boards. In a typical chemical milling process, an etchant solution etches the copper plated printed circuit board. One of the most common etchants in the electronic and computer industries is acidic copper chloride etchant which consists of hydrochloric acid (HCl) and copper chloride ($CuCl_2$). It has posed a substantial environment problem to dispose of spent etchant without proper treatment because the spent etchant contains a considerable amount of copper (10–15 w %). In addition, disposing of spent etchant without treatment results in great economic loss. Accordingly, recovery of the copper component from the waste etchant produced in the PCB industry is important in view of recycling a resource and reducing an environmental pollution.

Though the composition of acidic waste etchant may be different by PCB fabricating companies, it typically contains 19~25 wt % of $CuCl_2$, 7~10 wt % of HCl, 64.5~74 wt % of $H_2O$.

A conventional method for preparing copper oxide is disclosed in a literature (J. Korean Solid Waste Engineering Society, Vol. 14, No. 7, 667–672, 1997) in which basic waste etchant (composition: $Cu(NH_3)Cl$, $NH_4NO_3$, $(NH_4)_2CO_3$ and $NH_4OH$) is added quantitatively to acidic waste to obtain precipitation, and then the precipitation is sintered to obtain copper oxide.

However, with this method, since the basic copper chloride waste etchant itself contains quite a few amount of heavy metals as impurities, the recovered copper oxide accordingly contains the heavy metals as impurities. Thus, the copper oxide prepared using this method is not suitable to use for a high purity reagent or for semiconductor device. Thus, this method indispensably needs a process to purify and remove the impurity.

The Korean Patent No. 96-775 discloses a method for preparing copper oxide from an acidic copper chloride waste etchant through which ammonia gas passes to thereby fabricate a copper-ammonia complex. An additional amount of sodium hydroxide is added to a copper-ammonia complex to produce copper oxide. This method, however, is disadvantageous in that since a large quantity of ammonium chloride by-product is created, an additional expense is incurred to process the by-product, accounting for a great percentage of its production cost.

Thus, the inventors of the present invention has developed an environmental-friendly and cost-effective process for preparing copper oxide of homogeneous particle size, and attained an improved method for synthesizing copper oxide.

In detail, according to the newly attained method by the inventors of the present invention from the research, when acidic copper chloride waste etchant was neutralized by controlling pH and temperature, blue copper hydroxide and sodium chloride as by-products were recovered. When this slurry was heated at a temperature of 50~100° C., it was observed that the slurry was changed to copper oxide of a needle form with homogeneous particle size distribution.

SUMMARY OF THE INVENTION

Therefore, an object of the present invention is to provide a method for preparing copper oxide where alkali aqueous solution is added to an acidic copper chloride waste etchant (composition: 19~25.5 2t % of $CuCl_2$, 7~10 wt % of HCl and 64.5~74 wt % of $H_2O$) created in fabricating a PCB to produce copper hydroxide as an intermediate, and the copper hydroxide is heated to obtain copper oxide having a more than 99.0 wt % of purity and excellent filtration ability.

To achieve these and other advantages and in accordance with the purpose of the present invention, as embodied and broadly described herein, there is provided a method for preparing copper oxide, including: a first step in which a sodium hydroxide aqueous solution is added to an acidic copper chloride waste etchant produced in the PDB industry, to obtain copper hydroxide slurry; and a second step in which the slurry obtained in the first step is heated and sintered to thereby fabricate a needle-form copper oxide having a purity of more than 99.0 wt %.

The foregoing and other objects, features, aspects and advantages of the present invention will become more apparent from the following detailed description of the present invention.

DETAILED DESCRIPTION OF THE PREFERRED EMBODIMENTS

The present invention relates to preparation of a highly pure copper oxide from waste etchant created when a printed circuit board (PCB) is fabricated.

In other words, sodium hydroxide or potassium hydroxide is added to waste etchant to obtain copper hydroxide and the obtained copper hydroxide is heated to thereby fabricate copper oxide having a high purity (99.0 wt %) and a desirable filtration with its needle-form crystal morphology.

In detail, according to the outcome of the research for the method for recycling copper oxide having a high purity and even particles from an acidic copper chloride waste etchant produced in the PCB industry, it was observed that when sodium hydroxide or potassium hydroxide is slowly added to the acidic copper chloride waste etchant at the temperature of 10~30° C. to obtain (a first process) a blue-colored copper hydroxide slurry, and then, when the slurry is heated and sintered (a second process) (40–100° C.) for a 1~3 hours, the slurry is changed to a black copper oxide.

In the first process, as the alkali aqueous solution, either sodium hydroxide or potassium hydroxide can be used. But in consideration of easiness of obtaining a material and a unit cost of production of the copper oxide, it is preferred to use sodium hydroxide.

Referring to an addition amount of the sodium hydroxide, it is preferably added by 820~1,100 g for 1 liter of the acidic copper chloride waste etchant. If the sodium hydroxide is added by less than 820 g, the reaction is not complete so that its product contains an excess of chlorine impurity. Meanwhile, if the sodium hydroxide is added by more than 1,100 g, an excess of sodium hydroxide is unnecessarily consumed regardless of the reaction.

The reason why the reaction temperature is set by 10~30° C. is as follow. Addition of NaOH to the waste etchant generates a large amount of heat caused by acid-base titration since waste etchant contains a large amount of HCl. It leads to instant increase of reaction temperature up to 80° C. Copper hydroxide was formed at the beginning of the reaction. However, copper hydroxide was dehydrated instantly at that temperature to form copper oxide. Prepared copper oxide by this process shows platy shape by SEM analysis. On the other hand, addition of NaOH to the waste etchant with maintaining reaction temperature under 30° C. results in copper hydroxide slurry having bright blue color. Aging copper hydroxide precursor at 40° C.–100° C. for 1–3 hours produces the black precipitation of copper oxide. From SEM analysis, it can be seen that copper oxide prepared through copper hydroxide precursor has needle shape.

The dried copper oxide is sintered at the preferable temperature of 100~400° C. If the temperature is lower than 100° C., the sintering is not completely achieved. The dried copper oxide may be sintered at a temperature of more than 400° C., but, for the sake of economical energy consumption, the temperature of 400° C. at the maximum is most desirable.

Unlike the copper oxide obtained in the conventional art, the copper oxide obtained under the condition of the present invention has the purity of 99.0 wt % and needle-form crystal morphology, so that it can be easily filtered.

The copper oxide prepared according to the fabricating method of the conventional art has the spherical crystal morphology as disclosed in the literature [J. Korean Solid Waste Engineering Society, Vol.14, No.7, 667–672,1997] or has the plate crystal structure as disclosed in the Korean Patent Publication No. 96-775, which lacks the advantages and features as that of the present invention.

The invention will be further illustrated by the following examples. It will be apparent to those having conventional knowledge in the field that these examples are given only to explain the present invention more clearly, but the invention shall not be limited to the examples given.

Embodiment 1

1,180 g (33 wt %) of sodium hydroxide aqueous solution was added to 1.2 liter of acidic copper chloride waste etchant (composition: 22 wt % of $CuCl_2$, 11 wt % of HCl and 67 wt % of $H_2O$) at the temperature of 20~30° C., to obtain a blue-colored copper hydroxide slurry.

The acidic copper chloride waste etchant contains 22 wt % of $CuCl_2$ and 11 wt % of HCl. Thus, in order to neutralize it, theoretically, a 1,140 g of sodium hydroxide aqueous solution is necessary, but 1,180 g of sodium hydroxide aqueous solution, an excessive quantity than a theoretical value, was used.

After the reaction was terminated, the pH of the obtained solution was 11.8.

The slurry was heated at the temperature of 50° C. for two hours and a black-colored copper oxide precipitated.

The copper oxide precipitation was washed in 2.4 liter of water, filtered and dried in an oven at the temperature of 100° C. for two hours.

After the product was sintered at the temperature of 300° C. for two hours, its chemical composition was analyzed. According to the analysis, the purity of the copper oxide was 99.76%. And, according to observation on the copper oxide using a scanning electron microscope, the copper oxide has a size of 7.5~10 μm, a needle form, and it can be easily filtered.

Embodiment 2

1,180 g (33 wt %) of sodium hydroxide aqueous solution was added to 1.2 liter of acidic copper chloride waste etchant (composition: 22 wt % of $CuCl_2$, 11 wt % of HCl and 67 wt % of $H_2O$) at the temperature of 30° C., to obtain a blue-colored copper hydroxide slurry.

After the reaction was terminated, the pH of the obtained solution was 11.8.

The slurry was heated at the temperature of 70° C. for two hours and a black-colored copper oxide precipitation.

The copper oxide precipitation was washed in 2.4 liter of water, filtered and dried in an oven at the temperature of 100° C. for two hours.

After the product was sintered at the temperature of 300° C. for two hours, its chemical composition was analyzed. The analysis indicated that the purity of the copper oxide was 99.76%. And, according to observation on the copper oxide by using a scanning microscope, the copper oxide has a size of 10~15 μm, a needle form, and it can be easily filtered.

Comparative Example 1,180 g (33 wt %) of sodium hydroxide aqueous solution was added to 1.2 liter of acidic copper chloride waste etchant (composition: 22 wt % of $CuCl_2$, 11 wt % of HCl and 67 wt % of $H_2O$), for which a temperature was not controlled.

Due to the acid-base neutralization reaction, heat was excessively generated, so that the temperature of its reactor went up to 60° C.

The copper hydroxide generated at the initial stage of the reaction was dehydrated at a temperature of 60° C., changed to a black-colored copper oxide instantly during the reaction.

After the reaction was terminated, the pH of the obtained solution was 10.72.

The slurry was heated at the temperature of 60° C. for two hours and the reaction was completed.

The copper oxide precipitation was washed in 2.4 liter of water, filtered and dried in an oven at the temperature of 100° C. for two hours.

After the product was sintered at the temperature of 300° C. for two hours, its chemical composition was analyzed. According to the analysis, the purity of the copper oxide was 97.18%. And, according to observation on the copper oxide by using a scanning electron microscope, the copper oxide has a size of 2~5 μm, a platy form, and its filtering was not easy.

As so far described, according to the present invention, alkali aqueous solution is added to the acidic copper chloride waste etchant produced in the PCB industry to obtain copper hydroxide, as an intermediate material, and then the slurry is heated and sintered to thereby fabricate needle-form copper oxide having a purity of more than 99.0 wt %.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method for preparing copper oxide, comprising the following steps of:
   a) adding an aqueous sodium hydroxide solution to an acidic copper chloride waste etchant at a temperature of 10–30° C., to obtain copper hydroxide slurry;
   b) aging the obtained copper hydroxide slurry at a temperature of 50–100° C., to obtain copper oxide in needle form having a purity of more than 99.0 wt %; and
   c) sintering the obtained copper oxide at a temperature of 100–400° C.

2. The method according to claim 1, wherein 820 g to 1,100 g of 33 wt % aqueous sodium hydroxide solution is added per 1 liter of acidic copper chloride waste etchant, having a composition of 19–25.5 wt % $CuCl_2$, 7–10 wt % of HCl and 64.5–74 wt % of $H_2O$.

3. The method according to claim 1, wherein the aging in step b) is carried out for one to three hours.

* * * * *